United States Patent

[11] 3,545,725

[72] Inventors Joseph A. Chandler
 Dickinson;
 Thomas M. Grubbs, Houston, Texas
[21] Appl. No. 770,371
[22] Filed Oct. 24, 1968
[45] Patented Dec. 8, 1970
[73] Assignee United States of America, as represented by the Administrator of the National Aeronautics and Space Administration

[54] WINCH HAVING CABLE POSITION AND LOAD INDICATORS
 10 Claims, 4 Drawing Figs.
[52] U.S. Cl. ................................................. 254/150, 254/173, 254/186
[51] Int. Cl. ..................................................... B66d 1/30
[50] Field of Search........................................... 254/172, 173, 150, 186, 187, 185; 74/(Inquired)

[56] References Cited
UNITED STATES PATENTS

| | | | |
|---|---|---|---|
| 1,811,623 | 6/1931 | Ferguson...................... | 254/186 |
| 1,923,694 | 8/1933 | Weaver........................ | 254/173 |
| 3,020,508 | 2/1962 | Zuehlke...................... | 338/162 |
| 3,024,001 | 3/1962 | Worden........................ | 254/150 |
| 3,203,672 | 8/1965 | Santos......................... | 254/173 |
| 3,309,066 | 3/1967 | Carlson....................... | 254/186 |

Primary Examiner—Harvey C. Hornsby
Attorneys—Marvin F. Matthews, Russell E. Schlorff and G. T. McCoy ABSTRACT: A winch is disclosed that pays out and reels in cable through a fixed guide. The cable is wound on a helically grooved drum that is free to move axially along the longitudinal axis of its supporting shaft as required to maintain the cable coming off the drum in line with the cable guide. The bearings supporting the cable drum are located equal distances from the cable guide on opposite sides thereof so that the force imposed on the shaft by the cable is equally divided between the bearings. A strain gage is mounted on one bearing cap to indicate the reaction at this bearing due to the cable load to provide a continuous measurement of the force on the cable. The contact of a linear potentiometer is moved by the drum as it moves axially to vary an electrical signal, which is used to indicate drum position and the amount of cable payed out at any given time.

Joseph A. Chandler
Thomas M. Grubbs
INVENTORS

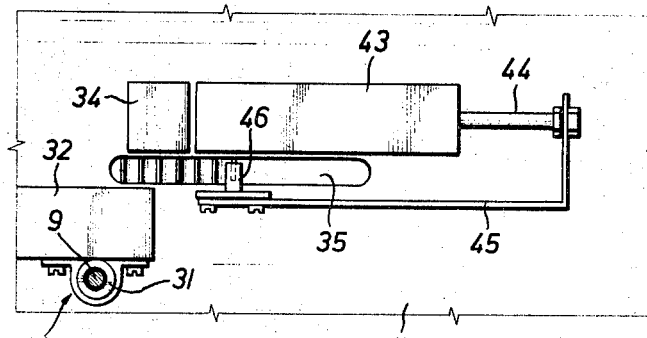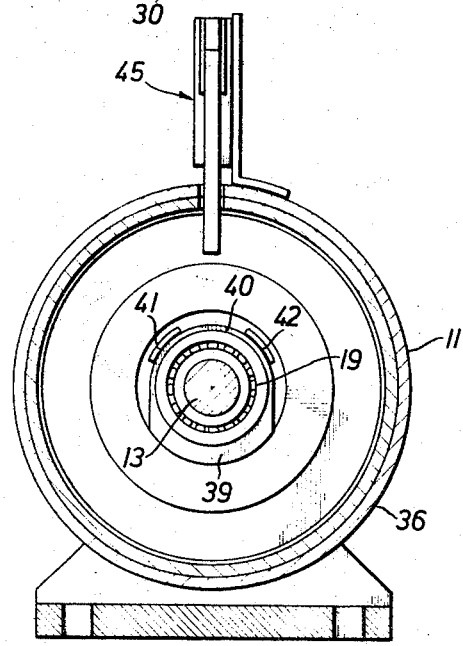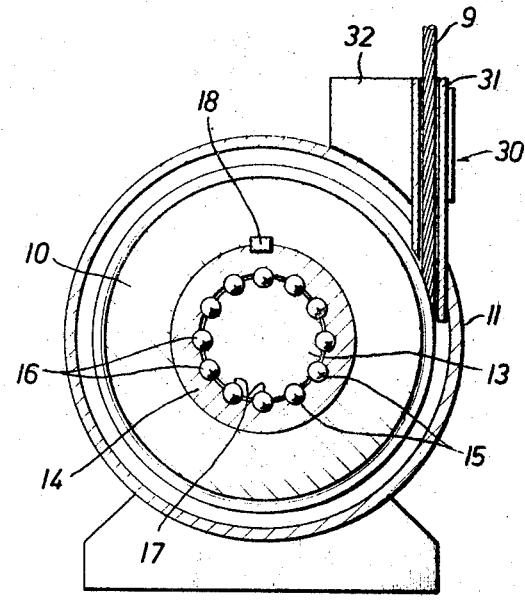

WINCH HAVING CABLE POSITION AND LOAD INDICATORS

The invention described herein was made by employees of the United States Government and may be manufactured and used by or for governmental purposes without the payment of any royalties thereon or therefor.

This invention relates to winches generally, and in particular to winches that indicate the length of line or cable payed out from the winch and the load being imposed on the cable.

There are many applications where a winch is used to exert a force on a cable or flexible line and wherein the amount of line out at a given time and the load on the line is important information. For example, in testing large parachutes, the riser lines or cables are connected to individual winches. To properly determine the effectiveness of the parachute, it is important to know at any given time the load on each line and the relative positions of the parachute control surfaces for the given load. To get this information it is necessary to know how much cable has been payed out and the cable loading.

Prior art position indication systems utilized a reduction gear drive to position the contact of a rotary potentiometer which electrically indicated the position of the cable on the drum. The load on the line was measured by passing the line over an idler sheave, which changed the direction of travel of the cable from what it was when it left the drum so that there would be a force component imposed on the linkage supporting the idler sheave. The amount of this force component was measured by a strain gauge mounted on the supporting linkage of the sheave.

The reduction gear train through which the drum drove the rotary potentiometer was expensive and complex. Also, the load sensing device was susceptible to damage due to its position above the drum. Also, a mounting was required for the idler sheave capable of withstanding a a substantial portion of the load on the cable, which further complicated the structure of the winch.

It is an object of this invention to provide an improved winch of simple construction that will indicate the amount of line payed out and the load thereon.

It is another object to provide a winch wherein the drum is connected directly to the movable contact of a linear potentiometer to indicate the amount of line pay out.

It is a further object to provide a winch that will indicate the load on the cable while allowing the cable to be fed directly from the drum to the load thereby eliminating the need for load supporting apparatus in addition to what is required to support the drum.

It is a further object to provide a winch having a cable drum that will move axially along the longitudinal axis of its supporting shaft as it pays out or reels in cable with the movement of the drum changing directly the setting on a linear potentiometer to indicate the amount of cable pay out at any given time.

It is a further object to provide a winch in which the load imposed on the cable drum by the cable is divided in fixed proportional amounts between the bearings supporting the cable drum shaft regardless of the position of the drum on the shaft whereby the load imposed on the cable can be determined by measuring the load on one bearing.

These and other objects, advantages, and features of this invention will be apparent to those skilled in the art from a consideration of this specification, including the attached drawings and appended claims.

The invention will now be described in connection with the attached drawings in which:

FIG. 2 is a view taken along line 2—2 of FIG. 1 illustrating the cable pay out indicating means;

FIG. 3 is a view taken along line 3—3 of FIG. 1; and

FIG. 4 is a cross-sectional view taken along line 4—4 of FIG. 1.

Figure 1:
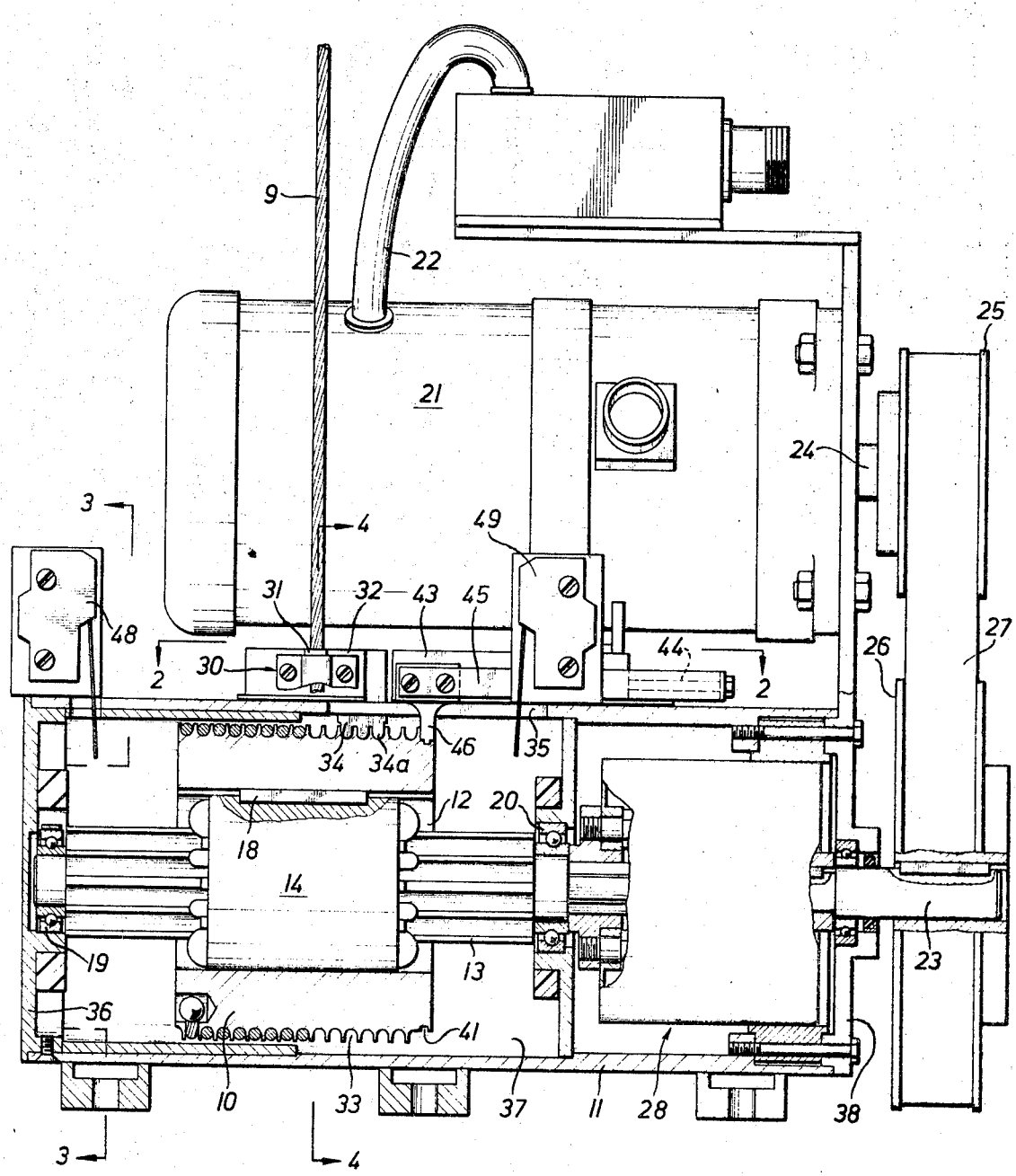
FIG. 1 is a view, partially in vertical section and partially in elevation of the preferred embodiment of the winch of this invention.

Flexible line or cable 9 is wound on cable drum 10, which is located in housing 11. Means are provided for supporting the drum and for transmitting torque to rotate the drum, while permitting movement of the drum axially. In the embodiment shown, drum 10 has centrally located opening 12 therethrough to receive splined shaft 13 and bearing race 14. The bearing race has a plurality of grooves 15 in which are located balls 16 (FIG. 4) that also engage grooves 17 in splined shaft 13. The balls rollingly support drum 10 for axial movement along the longitudinal axis of the shaft and parallel to the grooves. The balls will not permit relative rotation of the drum and the shaft, but will transmit torque from the shaft to the bearing race and to the drum through key 18.

Bearing means are located on opposite sides of the drum to support the shaft for rotation in housing 11. In the embodiment shown, ball bearings 19 and 20 support shaft 13 at opposite ends thereof. Power for rotating drum 10 to exert a pull on cable 9 is provided by reversible electric motor 21. Electric current is supplied to the motor through line 22 from a source of electric power (not shown).

The electric motor drives shaft 23 through a belt drive. Preferably, a timing belt is employed, such as the type available from Morris Chain Company, their Catalog No. 2708100. Output shaft 24 of the electric motor and shaft 23 have timing belt sprockets 25 and 26 mounted thereon respectively to receive belt 27. The timing belt sprocket of shaft 23 is of a larger diameter than the one on output shaft 24 of the electric motor to provide a speed reduction between shaft 24 and shaft 23. Shaft 23 is connected to spline shaft 13 through speed reducer 28. One such speed reducer that has been used is of the harmonic drive type manufactured by United Shoe Machinery Corporation.

Means are provided to guide the cable adjacent to the drum to keep the force exerted on the drum by the cable fixed relative to the bearing means so that proportional amounts of the load supported by each bearing is fixed and to force the drum to move longitudinally on the shaft as the cable is payed out or reeled in. A cable guide 30, comprising hollow bushing or sleeve 31, is mounted on support block 32 on housing 11. Cable 9 passes through sleeve 31 as it unwinds or is wound on the drum and is fixed relative to the bearings that support shaft 13. By fixing the path of the cable leaving the drum, the cable will exert lateral forces on the drum that will tend to move the drum axially along shaft 13 as the cable is payed out or reeled in through the cable guide. In the embodiment shown, however, means are provided to positively move the drum axially on the shaft. The outer surface of drum 10 is equipped with helical groove 33 in which the cable is wound. Member 34 is mounted in housing 11, as shown in FIG. 2, and extends through an opening (not shown) in the housing. The member has segments 34a of helical female threads which engage grooves 33 in the drum and force the drum to move axially relative to the housing, as the drum is rotated.

By fixing the position of cable 9 relative to bearings 19 and 20, the proportional amount of the reactive force exerted on each bearing, as a result of the pull on cable 9, will remain fixed. In other words, if the cable is located midway between the bearings, each bearing will support one-half of the load imposed on shaft 13 by the cable. If the cable is shifted toward one of the bearings and away from the other then the proportionate share of the load imposed on the closest bearing will increase and the load on the other bearing decrease, but the proportionate share for each bearing will remain fixed for any given position of the cable relative to the bearings.

Bearing 19 is supported by end plate 36 of housing 11. Bearing 20 is supported by partition 37, which separates the portion of the housing in which the drum is located from that in which gear reduction drive 28 is located. End plate 38 closes the other end of the housing.

End plate 36 is machined to provide saddle 39 to support the lower side of bearing 19 (FIG. 3). Connected thereto is relatively thin strap 40, which holds the bearing in saddle 39. Saddle 39 and strap 40 are integrally connected with the strap and saddle being machined from end plate 36.

Means responsive to the force exerted on the bearings is provided to indicate the force exerted on the cable. With bearing 19 in place as shown in FIG. 3, an upward force on shaft 13 exerted by cable 9 will produce strain in strap 40. Strain gauges 41 and 42 are attached to strap 40. The strain produced in the strap by the force on the cable is measured and converted to force on the cable in the well known manner. Since in the embodiment shown the load supported by bearing 19 and bearing 20 is equally divided, only the force imposed on one bearing need be measured to determine the total load on the cable by calibrating the strain gauge instruments to indicate twice the load measured.

Means are also provided that are responsive to the axial movement of the drum along the longitudinal axis of the shaft to indicate the position of the drum relative to the housing and the amount of cable payed out from the drum. A linearly adjustable variable resistor or potentiometer 43 is mounted on housing 11 with its actuator arm 44 extending parallel to shaft 13. Connected to the actuator arm is the foot of an L-shaped bracket 45. The end of the leg portion of bracket 45 is connected to a downwardly depending finger 46 which extends through opening 35 in housing 11. The end of finger 46 is engaged with annular groove 47 located adjacent the end of drum 10. The slot acts as a guide for finger 46. As mentioned, cable 9 is located in helical groove 33 and is dispensed through fixed cable guide 31. As shaft 13 is rotated, cable 9 is payed out through guide 30 and drum 10 moves axially along shaft 13. Accordingly, axial movement of the drum is transmitted to actuator arm 44 of linear potentiometer 43 by bracket 45. Therefore the electrical output of potentiometer 43 will provide an electrical signal proportional to the position of the drum relative to the potentiometer. Since the position of the drum is due to the winding or unwinding of the cable through fixed guide 30, the position of drum 10 will be indicative of the amount of cable on the drum. Therefore, the potentiometer can be calibrated to provide a direct indication of the amount of cable payout.

For safety purposes, limit switches 48 and 49 are mounted on housing 11 to be engaged by drum 10 when it reaches the limit of its travel in one direction. When engaged either switch will shut off power to electric motor 21 and stop the rotation of the drum.

From the foregoing it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

We claim:

1. In a winch assembly including a drum upon which a cable is wrapped and drive means for rotating the drum to pay out or reel in cable and for exerting a pull on the cable, the improvement, in combination therewith, of means for indicating the length of cable payed out and the load thereon, said means comprising a shaft for supporting the drum and for transmitting torque to rotate the drum, while permitting movement of the drum axially along the longitudinal axis of the shaft, bearing means rotatably supporting the shaft, fixed means for guiding the cable, electrical means responsive to the longitudinal movement of the drum on the shaft for indicating the position of the drum relative to the shaft and thereby the amount of cable payed out, and strain gauge means for indicating the force exerted on the cable.

2. The apparatus of claim 1 in which the outside surface of the drum has a helical groove to receive the cable.

3. The apparatus of claim 2 in which the position indicating means includes a linearly adjustable variable resistor and means movable by the drum for changing the setting of the resistor.

4. The apparatus of claim 3 in which an L-shaped bracket is attached to the actuator arm of the linearly adjustable variable resistor, said bracket extending substantially parallel with the drum shaft and a finger extending from the end of the bracket is connected with the drum.

5. The apparatus of claim 4 in which the finger extending from the bracket extends through a longitudinally extending slot which acts as a guide for the finger.

6. The apparatus of claim 5 in which the bearings are spaced on each side of the guide means and the force indicating means includes a bearing cap for each bearing for holding the bearings in place against the upward pull of the cable and a strain measuring gauge mounted on one cap for measuring the strain of the cap due to the force imposed on the cable.

7. In a winch assembly including a drum upon which a cable is wrapped and drive means for rotating the drum to pay out or reel in cable and for exerting a pull on the cable, the improvement, in combination therewith, of means for indicating the length of cable payed out and the load thereon, said means comprising a shaft for supporting the drum and for transmitting torque to rotate the drum, while permitting movement of the drum axially along the longitudinal axis of the shaft, bearing means located on each side of the drum and rotatably supporting the shaft, the outside surface of the drum having a helical groove to receive the cable, means guiding the cable, and electrical means responsive to the longitudinal movement of the drum on the shaft for indicating the position of the drum relative to the housing and thereby the amount of cable payed out.

8. The apparatus of claim 7 in which the position indicating means includes a linear potentiometer and means movable by the drum for changing the setting of the potentiometer.

9. In a winch assembly including a drum upon which a cable is wrapped and drive means for rotating the drum to pay out or reel in cable and for exerting a pull on the cable, the improvement, in combination therewith, of means for indicating the length of cable payed out and the load thereon, said means comprising a shaft for supporting the drum and for transmitting torque to rotate the drum, while permitting movement of the drum axially along the longitudinal axis of the shaft, bearing means located on each side of the drum and rotatably supporting the shaft, means guiding the cable adjacent the drum to keep the force exerted on the drum by the cable fixed relative to the bearing means so the proportional amount of the load supported by each bearing is fixed and to force the drum to move longitudinally on the shaft as the cable is payed out or reeled in, means responsive to the longitudinal movement of the drum for indicating cable pay out, and means responsive to the force exerted on the bearings for indicating the force exerted on the cable.

10. The apparatus of claim 9 in which the bearings are equally spaced on each side of the guide means and the force indicating means includes a bearing retaining strap for one bearing for holding the bearing in place against the upward pull of the cable and strain measuring gauges mounted on the retaining strap for measuring the strain of the strap due to the force imposed on the cable.